US008661102B1

(12) United States Patent
Steiner et al.

(10) Patent No.: US 8,661,102 B1
(45) Date of Patent: Feb. 25, 2014

(54) SYSTEM, METHOD AND COMPUTER PROGRAM PRODUCT FOR DETECTING PATTERNS AMONG INFORMATION FROM A DISTRIBUTED HONEY POT SYSTEM

(75) Inventors: Thomas C. H. Steiner, Linz (AT); Andreas Schlemmer, Steyr (AT); Paul G. Fellner, Marchtrenk (AT)

(73) Assignee: McAfee, Inc., Santa Clara, CA (US)

( * ) Notice: Subject to any disclaimer, the term of this patent is extended or adjusted under 35 U.S.C. 154(b) by 1001 days.

(21) Appl. No.: 11/289,344

(22) Filed: Nov. 28, 2005

(51) Int. Cl.
*G06F 15/16* (2006.01)
(52) U.S. Cl.
USPC .......................................... 709/223; 709/201
(58) Field of Classification Search
USPC ................................................ 709/201, 223
See application file for complete search history.

(56) References Cited

U.S. PATENT DOCUMENTS

| | | | | |
|---|---|---|---|---|
| 4,121,818 | A * | 10/1978 | Riley et al. | 270/52.29 |
| 5,613,206 | A * | 3/1997 | Bantz et al. | 455/450 |
| 5,862,385 | A * | 1/1999 | Iitsuka | 717/156 |
| 5,987,610 | A | 11/1999 | Franczek et al. | |
| 6,073,142 | A | 6/2000 | Geiger et al. | |
| 6,163,804 | A * | 12/2000 | Matsui | 709/219 |
| 6,460,050 | B1 | 10/2002 | Pace et al. | |
| 7,467,408 | B1 * | 12/2008 | O'Toole, Jr. | 726/22 |
| 7,506,155 | B1 | 3/2009 | Stewart et al. | |
| 7,594,263 | B2 * | 9/2009 | Boulanger et al. | 726/16 |
| 7,725,937 | B1 * | 5/2010 | Levy | 726/23 |
| 2004/0078592 | A1 * | 4/2004 | Fagone et al. | 713/201 |
| 2004/0083299 | A1 * | 4/2004 | Dietz et al. | 709/230 |
| 2004/0117640 | A1 * | 6/2004 | Chu et al. | 713/188 |
| 2004/0215972 | A1 * | 10/2004 | Sung et al. | 713/201 |
| 2004/0255167 | A1 * | 12/2004 | Knight | 713/201 |
| 2005/0177872 | A1 * | 8/2005 | Boulanger et al. | 726/22 |
| 2005/0210534 | A1 * | 9/2005 | Krishnamurthy | 726/23 |
| 2006/0101516 | A1 * | 5/2006 | Sudaharan et al. | 726/23 |
| 2007/0067841 | A1 * | 3/2007 | Yegneswaran et al. | 726/23 |
| 2009/0328213 | A1 * | 12/2009 | Blake et al. | 726/23 |

OTHER PUBLICATIONS

Lance Spitzner, HOSUS (honeypot surveillance system), Dec. 2002 • vol. 27 • No. 6.*
Holz, Thorsten, "New Fields of Application for Honeynets", RWTHAACHEN Department of Computer Science, Aug. 25, 2005.
"Top Ten Requirements for Next-Generation IDS", White Paper, McAfee, Sep. 2003.
"Developments of the Honeyd Virtual Honeypot", Monkey.org Developments.

\* cited by examiner

*Primary Examiner* — Tauqir Hussain
*Assistant Examiner* — Ebrahim Golabbakhsh
(74) *Attorney, Agent, or Firm* — Patent Capital Group

(57) ABSTRACT

A honey pot system, method and computer program product are provided. In use, information is collected which relates to network traffic targeting a plurality of computers associated with a distributed honey pot system. Next, a pattern is detected among the information collected from the distributed honey pot system. To this end, response data is generated, if the pattern is detected.

18 Claims, 6 Drawing Sheets

SYSTEM, METHOD AND COMPUTER PROGRAM PRODUCT FOR DETECTING PATTERNS AMONG INFORMATION FROM A DISTRIBUTED HONEY POT SYSTEM

FIELD OF THE INVENTION

The present invention relates to honey pots, and more particularly to using honey pots for detecting malicious behavior.

BACKGROUND

With the advent of general access computer networks, such as the Internet, people may now easily exchange application data between computer systems. Unfortunately, some people have taken advantage of such easy data exchange by developing various threats, such as malware, etc.

To date, numerous types of systems and techniques have been developed for combating such threats. For example, intrusion detection systems (IDS's) have been introduced for comparing network traffic against numerous patterns (e.g. signatures, etc.) that are indicative of an attack. Upon the detection of such a pattern in network traffic, an appropriate response may be initiated.

Unfortunately, IDS's mainly rely on attack patterns which need to be created, tested, and deployed on a regular basis to end users from an IDS vendor. Specifically, two problems arise from this strategy. First, novel attacks are not necessarily detected until appropriate patterns have been released. Secondly, due to the multitude of attack variations, the use of predefined patterns becomes more and more difficult. In particular, for example, IDS vendors are required to release signatures with increased frequency, but still struggle to catch up with the latest threats.

There is thus a need for overcoming these and/or other problems associated with the prior art.

SUMMARY

A honey pot system, method and computer program product are provided. In use, information is collected which relates to network traffic targeting a plurality of computers associated with a distributed honey pot system. Next, a pattern is detected among the information collected from the distributed honey pot system. To this end, response data is generated, if the pattern is detected.

DETAILED DESCRIPTION

Figure 1:
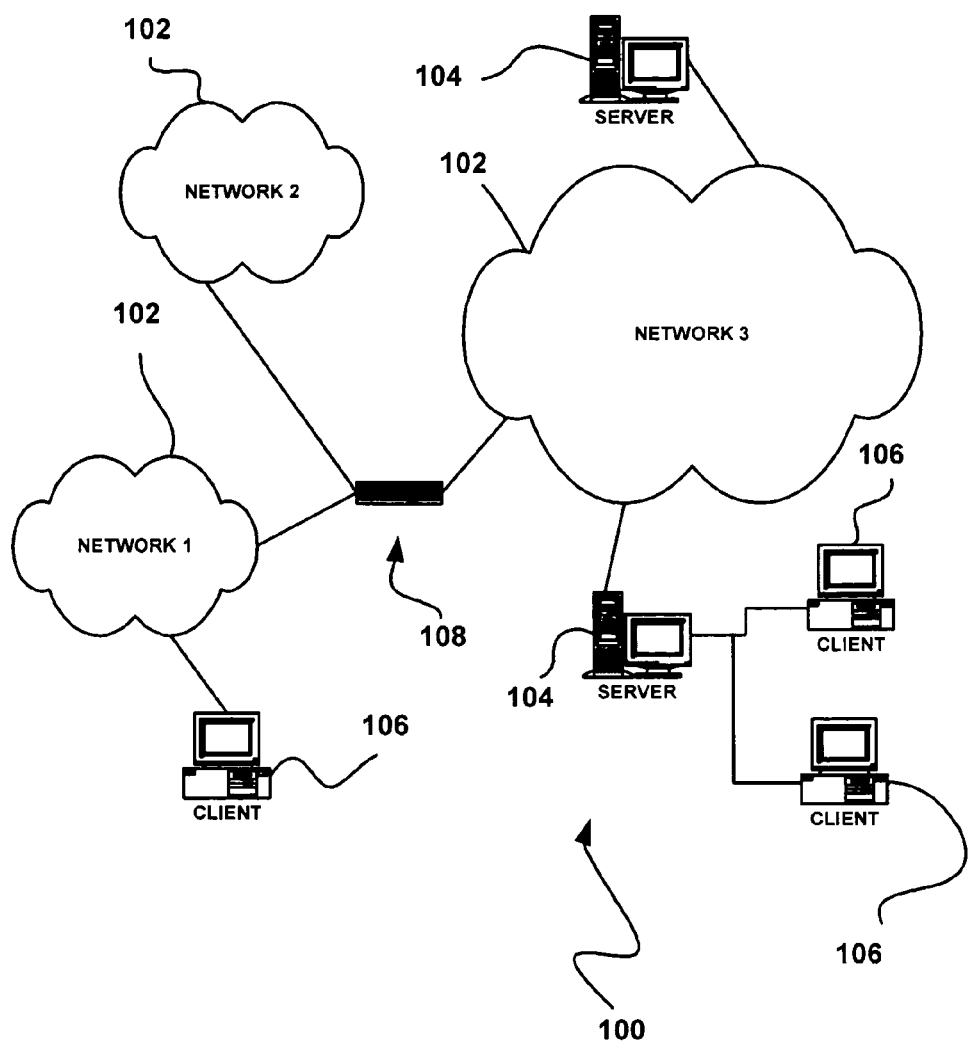
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

It should be noted that the present network architecture 100 may be equipped with a distributed honey pot system, such that one or more honey pots exist among multiple computers. Of course, one or more honey pots may exist on a particular computer. Still yet, at least one of the computers may include a data center for collecting information from the remaining computers equipped with at least one honey pot, for reasons that will become apparent hereinafter in greater detail.

Figure 2:
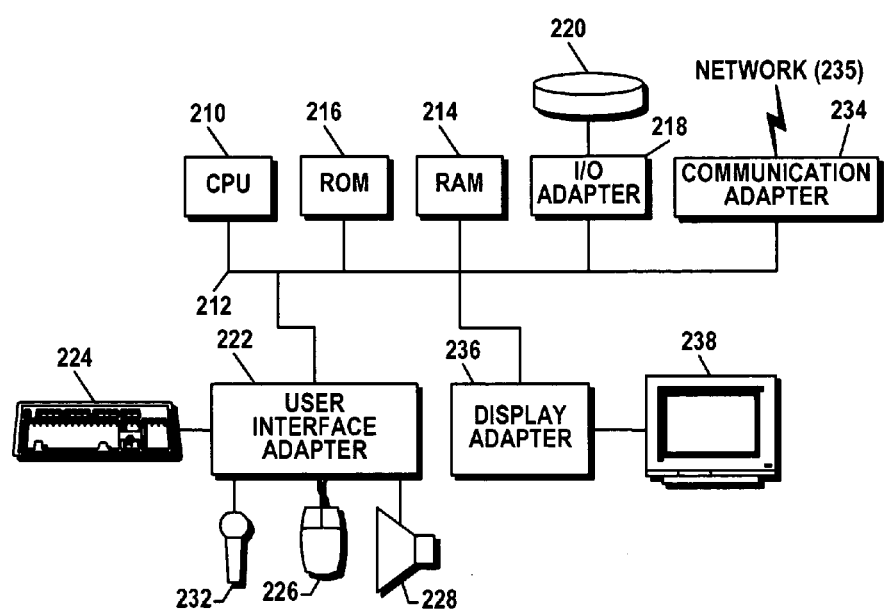
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
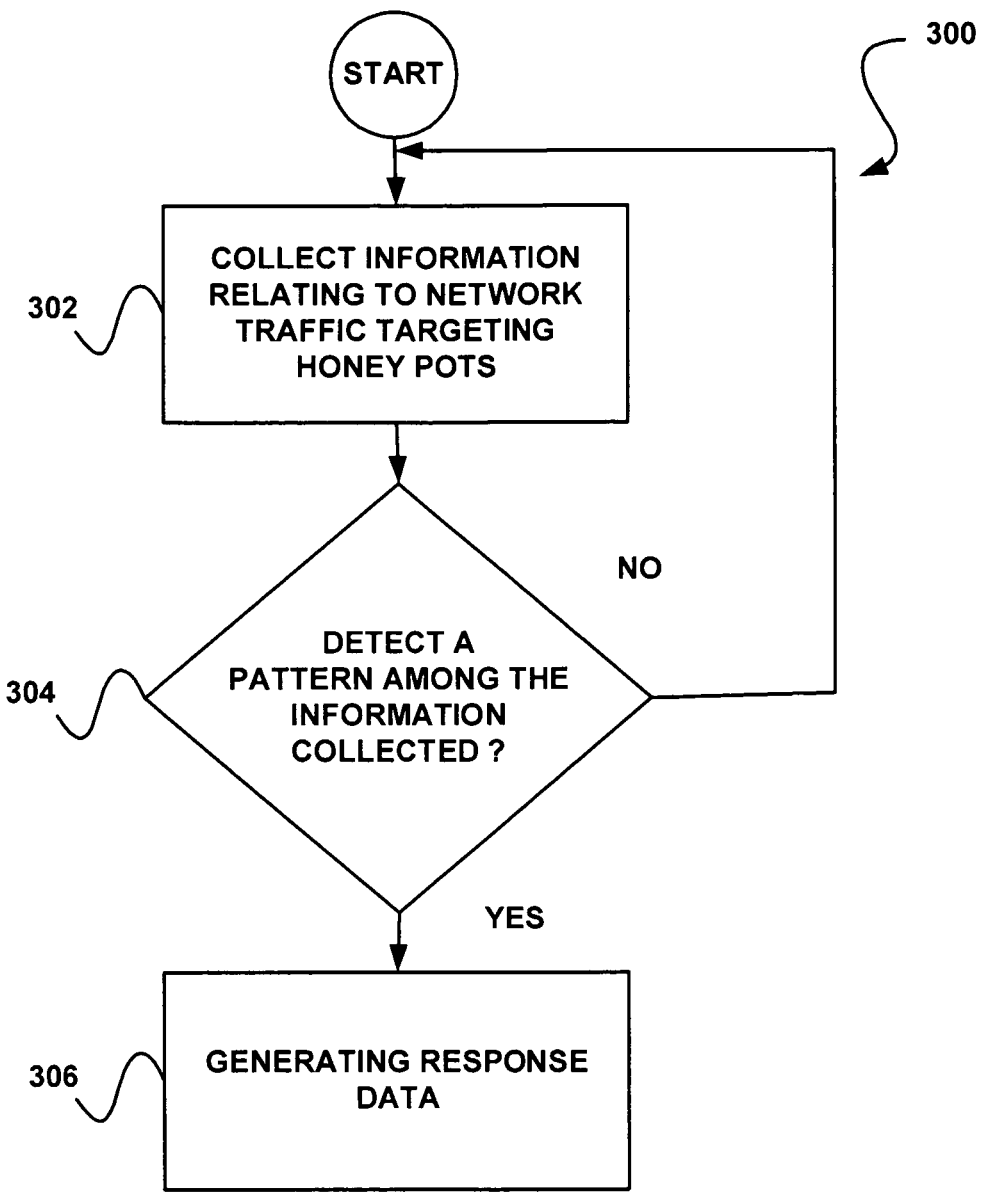
FIG. 3 shows a method for detecting patterns among multiple computers, in accordance with one embodiment.

FIG. 3 shows a method 300 for detecting patterns among multiple computers, in accordance with one embodiment. As an option, the present method 300 may be implemented in the context of the architecture and environment of FIGS. 1 and/or 2. Of course, however, the method 300 may be carried out in any desired environment.

As shown, information is collected which relates to network traffic targeting multiple honey pots residing on multiple computers (e.g. see, for example, the client computers 106 and/or server computers 104 of FIG. 1, etc.). Note operation 302. In one embodiment, such collection may be carried out via a network (e.g. see, for example, the networks 102 of FIG. 1, etc.), with the information arriving at one or more data center(s) residing on one or more computers (e.g. again, see, for example, the client computers 106 and/or server computers 104 of FIG. 1, etc.), for reasons that will soon become apparent. More exemplary information regarding such information collection and related functionality, according to one embodiment, will be set forth in greater detail during reference to FIG. 4.

The aforementioned information may include a source address, user credentials, a port, any information associated with an origin, information associated with the traffic itself (e.g. specific features present within network packets, etc.), and/or any other information capable of being used to identify patterns and/or generate response data, in the manner soon to be set forth. Still yet, in the context of the present description, the honey pot is deemed to include a system that attracts network traffic from malicious or unwanted/undesirable sources for the specific purpose of collecting information relating to such network traffic.

Next, in decision 304, it is determined whether a pattern is detected among the information collected from the computers equipped with the honey pots. Such pattern may involve absolutely any pattern that may be eventually found to be indicative of malicious or unwanted/undesirable network traffic or source(s) of network traffic. Still yet, in one embodiment, the present detection may occur at the aforementioned data center(s), or any other desired location. More exemplary information regarding such pattern detection and related functionality, according to one embodiment, will be set forth in greater detail during reference to FIG. 5.

To this end, in operation 306, response data may be generated, if the pattern is detected per decision 304. In the context of the present description, such response data may involve any data that is or can be used in association with a response to the detection of the pattern. Of course, such response may be automatic or manual, and/or passive or active. More exemplary information regarding such response data and associated responses, according to one embodiment, will be set forth in greater detail during reference to FIG. 6.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
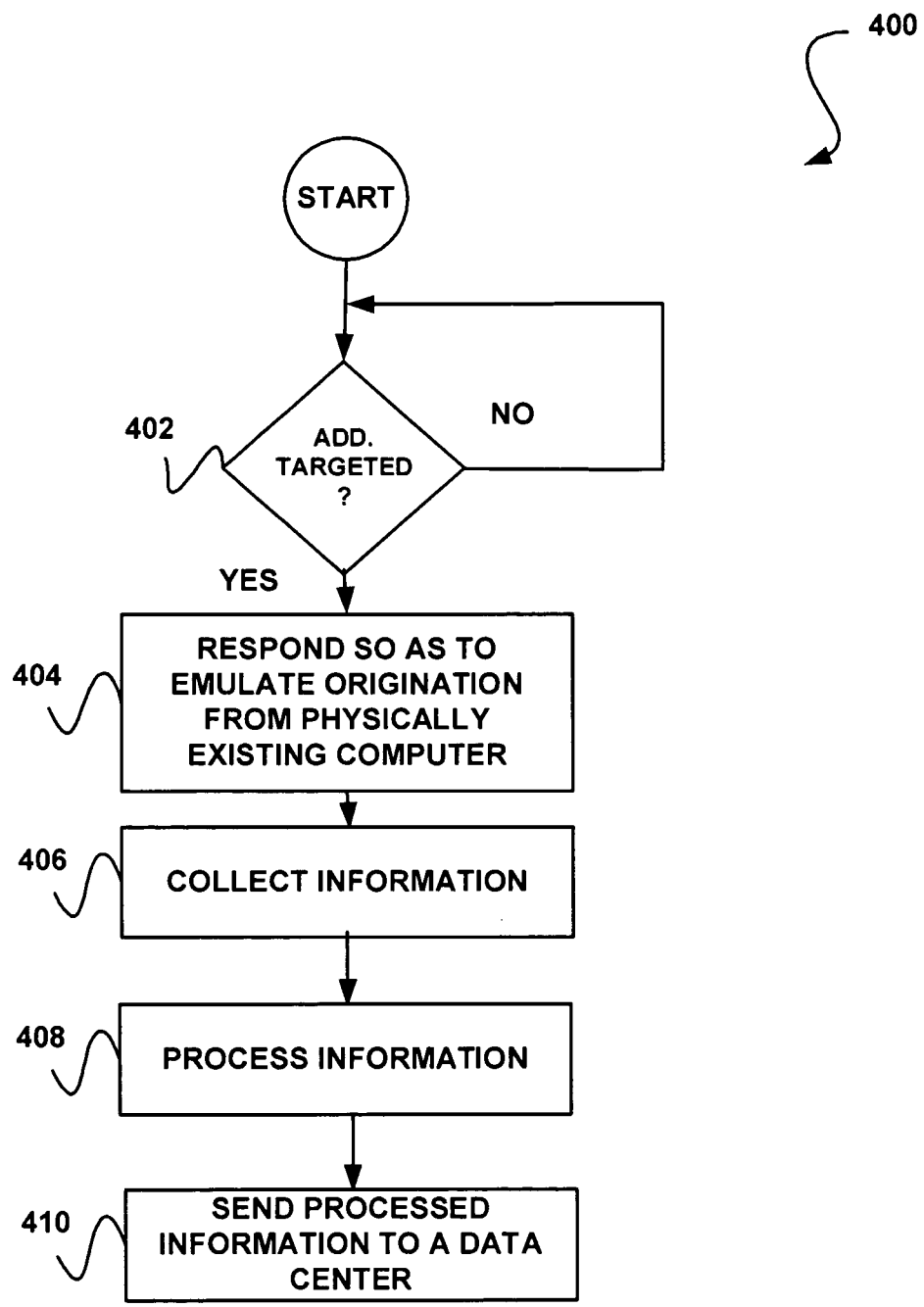
FIG. 4 shows a method for collecting information using honey pots at a plurality of computers, in accordance with one embodiment.

FIG. 4 shows a method 400 for collecting information using honey pots at a plurality of computers, in accordance with one embodiment. As an option, the present method 400 may be implemented in the context of the architecture and environment of FIGS. 1 and/or 2, and further in the context of operation 302 of FIG. 3. Of course, however, the method 400 may be carried out in any desired environment. The aforementioned definitions may further be deemed to apply in the instant description.

As shown, it is first determined whether an address is targeted. Note decision 402. Such targeting may involve any communication that is directed to a honey pot. Such address may be one of many unused network addresses, in one embodiment. Thus, in such embodiment, all (or many) unused network addresses within a given subnet may be allocated for such purpose.

If such an address is targeted per decision 402, a response may be initiated so as to emulate the origination of such response from a physically existing computer. Note operation 404. For this purpose, the present embodiment may be capable of translating popular services (e.g. HTTP, SMTP, TELNET, etc.), operating system fingerprints, and known vulnerabilities. Of course, the purpose of such operation involves enabling malicious actors to discover such virtual computers when scanning a network and attempting to exploit the same.

Next, in operation 406, information is collected relating to the traffic that is targeting the allocated address(es), and responding to the responses of operation 404. Again, such information may include a source address, user credentials, a port, any information associated with the origin, information associated with the traffic itself (e.g. specific features present within network packets, etc.), and/or any other information capable of being used to identify patterns and/or generate response data. As will soon become apparent, by analyzing only network traffic destined for emulated computers associated with the allocated addresses (occurring with low likelihood and, by definition, indicating possibly malicious activity, etc.), processing time and a probability for false alerts are reduced.

As an option, the various information collected in operation 406 may be processed before continuing on with subsequent operations. Note operation 408. In one embodiment, such processing may take the form of generating a hash associated with the information. As will soon become apparent, the use of such hashes may require less information to be transmitted and processed later.

In operation 410, the information collected via the honey pot (and possibly processed) is, in turn, collected by a data center via a network, by the computers administering the honey pots sending such information (processed or not). More information will now be set forth regarding the manner in which such information is used to detect patterns, etc.

Figure 5:
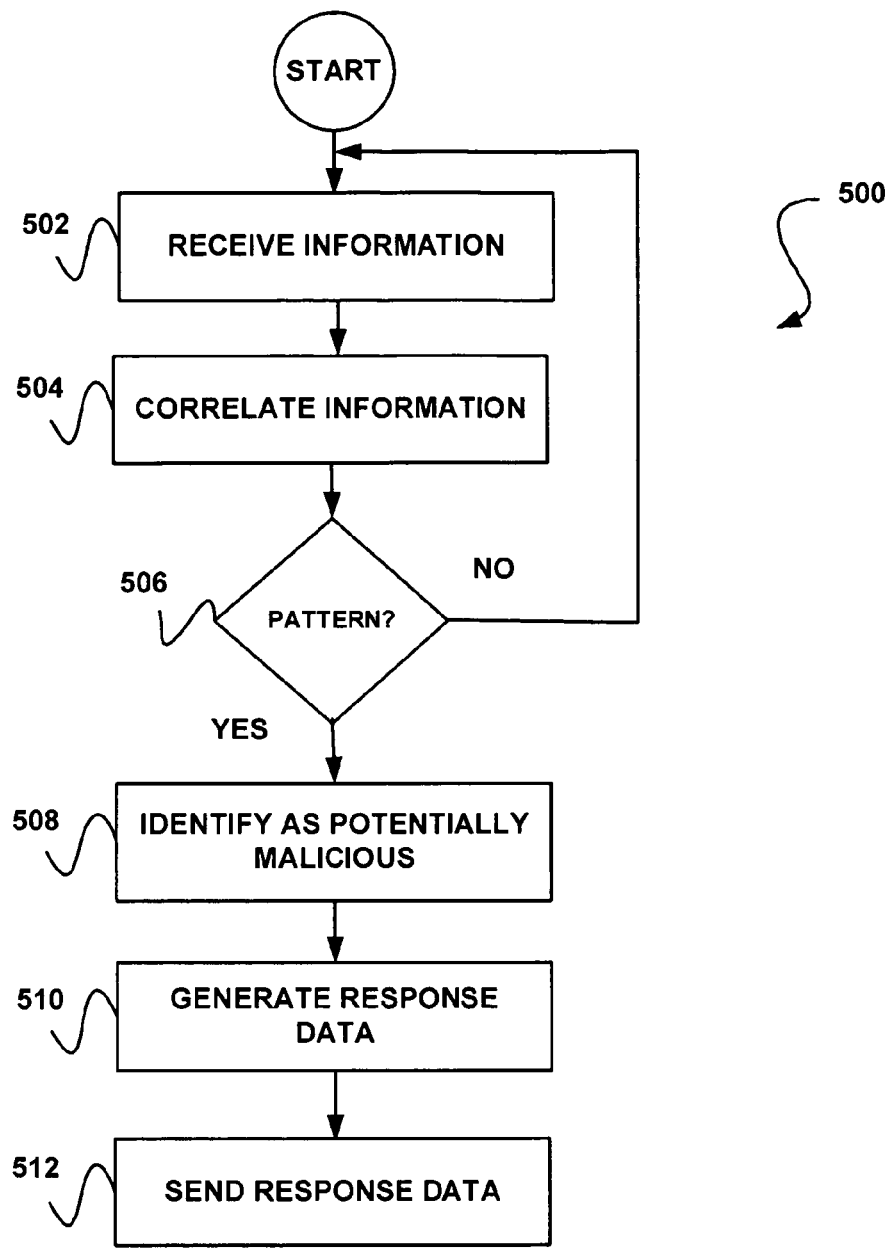
FIG. 5 shows a method for detecting patterns in information collected using honey pots at a plurality of computers, in accordance with one embodiment.

FIG. 5 shows a method 500 for detecting patterns in information collected using honey pots at a plurality of computers, in accordance with one embodiment. As an option, the present method 500 may be implemented in the context of the architecture and environment of FIGS. 1 and/or 2, and further in the context of decision 304 of FIG. 3. Of course, however, the method 500 may be carried out in any desired environment. Again, the aforementioned definitions may further be deemed to apply in the instant description.

In operation 502, information (see, for example, the collected/sent information per operations 406/410 that is optionally processed per operation 408 of FIG. 4, etc.) is received from the various honey pot-equipped computers. Such receipt may be prompted by either a push or pull mechanism. Further, the frequency of such receipt may be in real-time, periodic, initiated based on an availability of a connection or the information itself, etc.

Upon receipt, such information is then correlated in operation 504. In one of many embodiments, such correlation may involve identifying network traffic with a common source address, port, and/or any other common aspect of the collected information.

Such correlated network traffic may then be compared to identify any patterns. See decision 506. Such pattern may, for example, include any common behavior, heuristic similarities, a threshold of particular events, predetermined frequency/repetition associated with activities, etc. Of course, as mentioned previously, the pattern may involve absolutely any pattern that is indicative of malicious or unwanted/undesirable network traffic or source(s) of network traffic.

In the embodiment where the information is processed to include hashes, for example, operation 504 and decision 506 may be carried out by correlating the hashes or components thereof, as well as identifying patterns in the hashes or components thereof. To this end, bandwidth is saved by virtue of the receipt of the hashes, and storage is saved, as well as possible processing resources.

Upon a pattern being detected per decision 506, the subject network traffic may be identified as being at least potentially malicious and/or undesired/unwanted. See operation 508. To this end, appropriate response data may be generated and sent, as indicated in operations 510/512.

For example, a signature may optionally be created, which reflects the network traffic itself and/or the related behavior, etc. As yet another option, the response data may include rules tailored for blocking the network traffic at a plurality of computers. Still yet, instructions on alert generation may be included as yet another example of response data.

Again, as mentioned earlier, the response data may involve any data that is or can be used in association with a response to the detection of the pattern. Further, the response may be automatic or manual, and/or passive or active. In any case, the response data is then sent to the various honey pot-equipped computers and/or non-honey pot-equipped computers so that the appropriate response may be carried out thereon to deal with the potentially malicious and/or undesired/unwanted network traffic. More information will now be set forth regarding the manner in which such response data is used.

Figure 6:
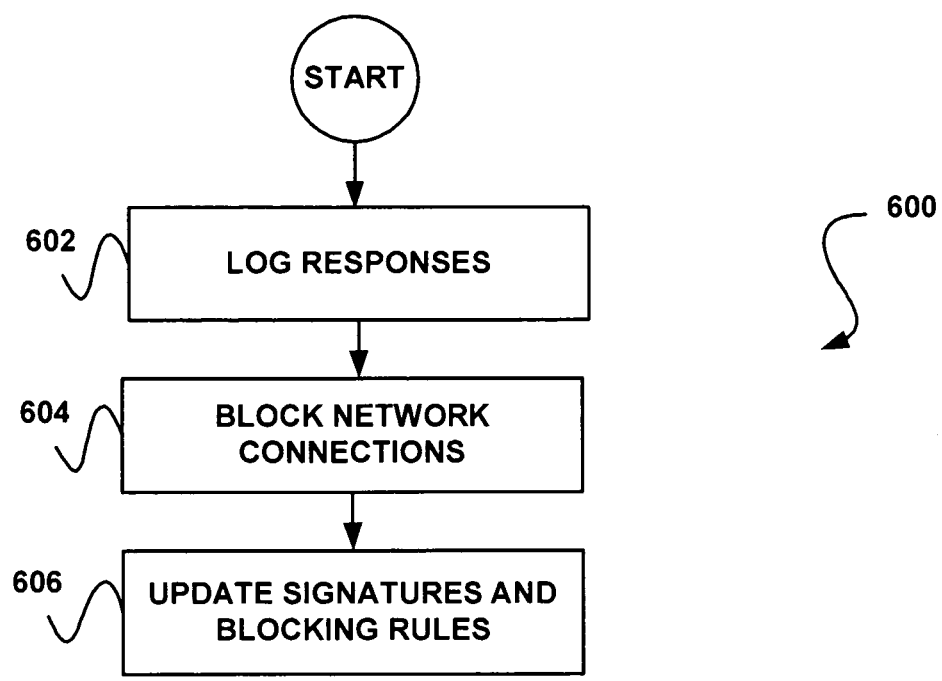
FIG. 6 shows a method for responding to the detection of patterns, in accordance with one embodiment.

FIG. 6 shows a method 600 for responding to the detection of patterns, in accordance with one embodiment. As an option, the present method 600 may be implemented in the context of the architecture and environment of FIGS. 1 and/or 2, and further in the context of decision 306 of FIG. 3. Of course, however, the method 600 may be carried out in any desired environment. Yet again, the aforementioned definitions may further be deemed to apply in the instant description.

In operation 602, response data (see, for example, the response data generated per operation 510, etc.) is received at the various honey pot-equipped computers (and possibly others as well). Again, such receipt may be prompted by either a push or pull mechanism. Further, the frequency of such receipt may be in real-time, periodic, initiated based on an availability of a connection or the response data itself, etc.

As yet another option, the various computers may request a particular set of response data (based on a desired response), so that a tailored set of response data is received. To this end, different computers may specify different criteria which the data center(s) may use to tailor the response data (and associated response) accordingly.

Various responses may be initiated after operation 602. For example, the response data may be logged, used to block network connections associated with the detected pattern (see operation 604), and optionally used to update signatures and other response rules (see operation 606), if available. Of course, additional responses may be carried out such as alerts to users and/or administrators, etc.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
   collecting information at a server, the information relating to network traffic targeting a plurality of computers having a respective honey pot that collectively form a distributed honey pot system;
   detecting a pattern among the information through a correlation of a plurality of hashes, wherein the pattern is indicative of malicious or unwanted traffic, and wherein the information is associated with the network traffic targeting a plurality of unused addresses of a subnet, and wherein the unused addresses of the subnet correspond to one or more of the honey pots of the distributed honey pot system;
   generating response data that emulates at least one computer, which was targeted by the malicious or unwanted traffic, wherein the response data is to be sent to a particular one of the plurality of computers associated with the distributed honey pot system, and wherein the generating includes translating a plurality of operating system fingerprints; and
   responding to responses that are generated as a result of the response data.

2. The method of claim 1, wherein the computers include client computers.

3. The method of claim 2, wherein the pattern is detected utilizing the server.

4. The method of claim 1, wherein the information is processed.

5. The method of claim 1, wherein the response data is capable of being used to block the network traffic.

6. The method of claim 1, wherein the information is associated with at least one of an origin of the network traffic and the network traffic itself.

7. The method of claim 6, wherein the information includes a source address.

8. The method of claim 6, wherein the information includes a port.

9. The method of claim 1, wherein the information is processed before being collected.

10. The method of claim 9, wherein the processed information includes hashes.

11. A computer program product embodied on a tangible non-transitory computer readable medium for performing operations, comprising:
    collecting information at a server, the information relating to network traffic targeting a plurality of computers having a respective honey pot that collectively form a distributed honey pot system;
    detecting a pattern among the information through a correlation of a plurality of hashes, wherein the pattern is indicative of malicious or unwanted traffic, and wherein the information is associated with the network traffic targeting a plurality of unused addresses of a subnet, and wherein the unused addresses of the subnet correspond to one or more of the honey pots of the distributed honey pot system;
    generating response data that emulates at least one computer, which was targeted by the malicious or unwanted traffic, wherein the response data is to be sent to a particular one of the plurality of computers associated with the distributed honey pot system, and wherein the generating includes translating a plurality of operating system fingerprints; and
    responding to responses that are generated as a result of the response data.

12. The method of claim 1, wherein multiple honey pots exist on one of the plurality of computers.

13. The method of claim 1, wherein the collecting includes the information arriving at one or more data centers.

14. The method of claim 13, wherein the detecting occurs at the one or more data centers.

15. The method of claim 1, wherein the pattern includes a common aspect that includes a common source address and port.

16. The method of claim 1, wherein the distributed honey pot system is configured for attracting particular network traffic from malicious sources in order to collect information relating to the particular network traffic.

17. A server, comprising:
- a processor; and
- a memory, wherein the server is configured to:
  - collect information at the server, the information relating to network traffic targeting a plurality of computers having a respective honey pot that collectively form a distributed honey pot system;
  - detect a pattern among the information through a correlation of a plurality of hashes, wherein the pattern is indicative of malicious or unwanted traffic, and wherein the information is associated with the network traffic targeting a plurality of unused addresses of a subnet, and wherein the unused addresses of the subnet correspond to one or more of the honey pots of the distributed honey pot system;
  - generate response data that emulates at least one computer, which was targeted by the malicious or unwanted traffic, wherein the response data is to be sent to a particular one of the plurality of computers associated with the distributed honey pot system, and wherein the generating includes translating a plurality of operating system fingerprints; and
  - respond to responses that are generated as a result of the response data.

18. The server of claim 17, wherein the server is provisioned as part of a data center.

* * * * *